Aug. 26, 1952   C. D. McDONALD ET AL   2,608,438
LAWN SPRINKLER
Filed June 11, 1951

Charles D. McDonald
Vernon M. Williams
William D. Swilling
INVENTORS.

BY *Clarence A. O'Brien*
*and Harvey B. Jacobson*
Attorneys

Patented Aug. 26, 1952

2,608,438

UNITED STATES PATENT OFFICE 2,608,438

LAWN SPRINKLER

Charles D. McDonald, Alice, Vernon M. Williams, Robstown, and William D. Swilling, Agua Dulce, Tex.

Application June 11, 1951, Serial No. 230,866

3 Claims. (Cl. 299—65)

The present invention relates to certain new and useful improvements in lawn sprinkers and has more particular reference to one which is characterized by a novel self-supporting stand and a unique jet swirling and emitting nozzle.

One object of the invention is to provide a lawn sprinkler which is structurally distinct in that it is possessed of peculiarly designed and functioning parts, whereby to provide a novel construction in which manufacturers, retailers and users will find their respective requirements and needs satisfactorily met.

More specifically, it is another object of the invention to provide an innovation in lawn sprinklers which has to do with a highly unique nozzle, that is, a nozzle which is in the form of a sturdy but limber hose capable of casting the water jets over the surrounding area in an odd but nevertheless effective manner.

A further object of the invention is to provide a sprinkler having the stated novelly constructed and mounted nozzle which takes the form of a length of hose of suitable resiliency which becomes erect under the action of water pressure passing therethrough and whirls about in a somewhat indeterminate manner, said hose being closed at its outer end and detachably mounted at its opposite end on the delivery pipe with which it is associated.

Then, too, it is a still further object of the invention to provide a lawn sprinkler having a novel tripod or stand which is characterized by branch portions of the water delivery pipe and an inverted V-shaped prop forming a suitable leg frame.

Other objects and advantages will become more readily apparent from the following description and the accompanying sheet of illustrative drawings.

In the accompanying sheet of drawings wherein like numerals are employed to designate like parts throughout the same:

Figures 1, 2, 3:
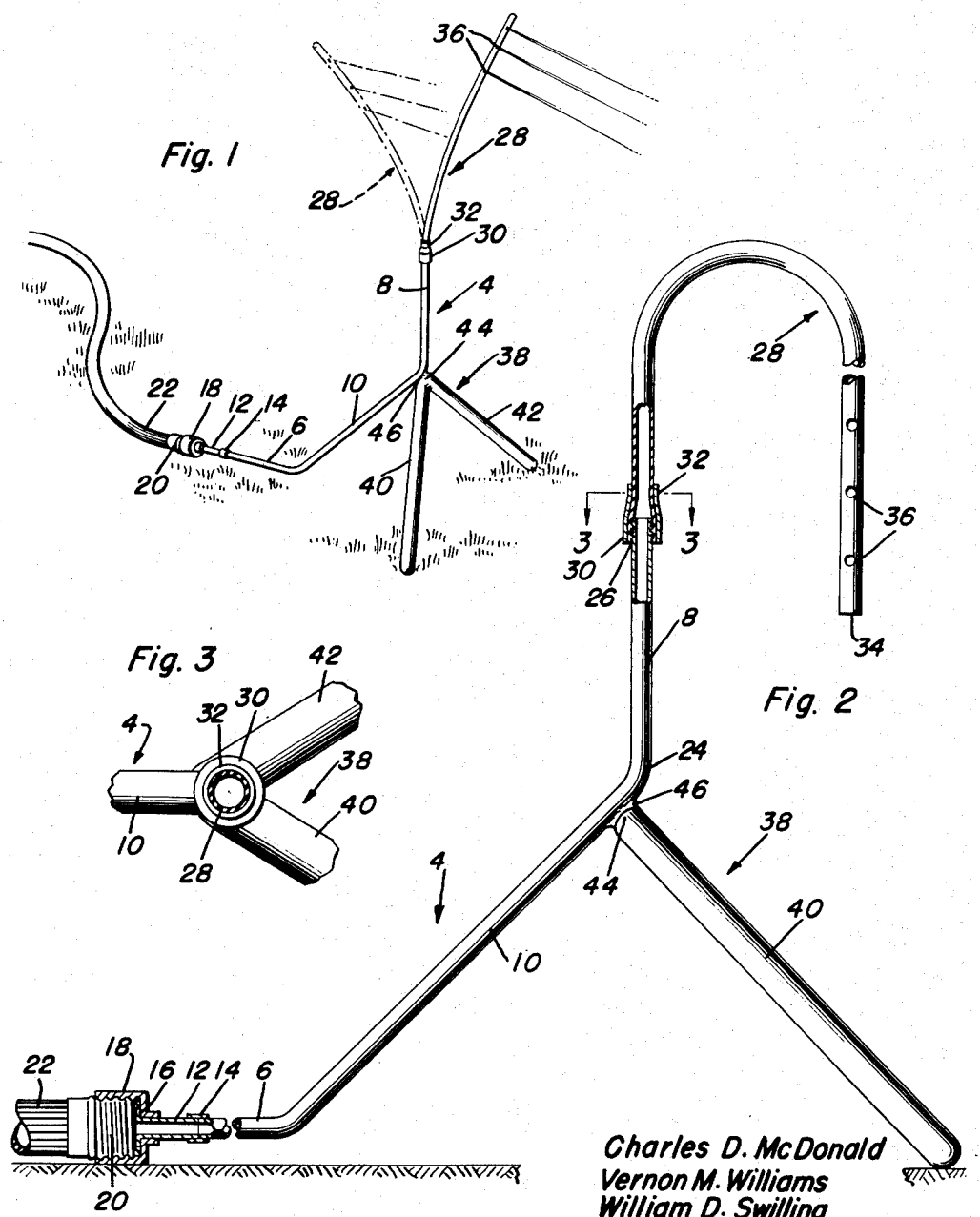
Figure 1 is a perspective view of a lawn sprinkler constructed in accordance with the present invention and showing the manner in which the same is set up and used.
Figure 2 is a view on an enlarged scale, a view which may be described as a side elevation with portions broken away and shown in section and with the nozzle in its out-of-use position.
Figure 3 is an enlarged cross section taken on the horizontal line 3—3 of Figure 2, looking in the direction of the arrows.

Referring now the drawings, attention is first directed to the main water-receiving and supply, this being denoted by the numeral 4. It is a suitable length of rigid pipe of appropriate length and diameter. It is peculiarly bent and has a horizontal intake branch 6 at its lower end and an upstanding perpendicular or vertical discharge branch 8 at the opposite or upper end and an inclined intermediate branch at 10. There is a fitting 12 joined to the intake end by an appropriate coupling 14 and the fitting is flanged as at 16 and provided with a swively mounted female hose coupling 18. This is to accommodate the screw-threaded male coupling member 20 on the coacting end of a conventional garden hose 22. The vertical discharge branch joins the inclined leg branch 10 by way of an elbow 24 and the discharge end is screw-threaded or similarly constructed as at 26 to accommodate the detachable nozzle 28. The latter is an unusual "nozzle" in that it takes the form of an elongated piece or length of hose preferably constructed from surgical rubber. One end of the hose is telescoped over the threaded end 26 of the discharge branch and is clamped removably thereon by a brass or equivalent sleeve 30. The sleeve is slidably mounted on the hose and has a restricted portion 32 so that when the sleeve is slid from right to left over the hose in Figure 2 and then brought into position the larger end portion 30 compresses and binds the coacting end portion of the hose on the threads, thus effecting a separable but fluid-tight connection. This connection is to permit the hose to be removed and replaced whenever necessary or desired. The outer end of the hose is closed as at 34 and on one side it is provided with longitudinally spaced apertures or jet discharge holes 36.

The branches 6 and 10 form one of the legs of the tripod-type stand. The remainder of the stand comprises a leg frame which may be referred as an inverted V-shaped prop 38. This is a comparatively sturdy member and the diverging portions provide the other two legs 40 and 42 of the tripod. The vertex or crotch portion 44 is welded or otherwise joined to the leg 10 just below the elbow 24 as at 46. Thus these three legs provide a tripod stand and it is believed to be unique to employ one of the branches of the water pipe 4 in conjunction with the prop in making up this stand. Actually, the leg 10 and its branch 6 do not rest on the ground but rather the hose coupling acts as a foot, this being on a plane with the free end portions of the two legs 40 and 42 as brought out in Figure 2.

It will be obvious that when the water is turned "on" it will flow by way of the branches 6, 10 and 8 of the pipe 4 into the nozzle. The nozzle, which is normally drooping will then become erect and render the action of the water escaping through the orifices or holes 36, it will whirl around in "whirligig" fashion and in somewhat indeterminate cycles. It will function to cast jets of water over the surrounding area of the lawn.

Minor changes in the shape, size, material and arrangements of parts may be resorted to in actual practice without departing from the spirit and scope of the invention, as claimed.

Having described the invention, what is claimed as new is:

1. A lawn sprinkler comprising a rigid inverted V-shaped prop embodying ground engaging legs, a rigid pipe having a horizontal branch lateral to said legs and providing an intake, a vertical discharge branch and an intermediate inclined branch extending above the vertex of said prop, the latter connected to said vertex, and flexible nozzle means carried by said vertical discharge branch.

2. A lawn sprinkler comprising a rigid inverted V-shaped prop having legs adapted to rest on the ground, a rigid pipe having a horizontal branch providing an intake, a vertical discharge branch and an intermediate inclined branch, the latter connected to the vertex portion of said prop, and nozzle means carried by said vertical discharge branch, said nozzle means being an elongated limber hose of a prescribed length which is closed at its outer end and provided inwardly of said outer end with constantly open spray holes, whereby said limber hose, under action of the pressured water has free whip action and wiggles about to broadcast the issuing water jets over the adjacent surrounding area of the lawn.

3. A lawn sprinkler comprising a rigid inverted V-shaped prop having legs adapted to rest on the ground, a rigid pipe having a horizontal branch providing a water intake, a vertical discharge branch extending to a position above the vertex of said prop, and also having an intermediate inclined branch rigidly secured to said vertex and extending downwardly from said vertex and providing a third leg, the latter and the legs of said prop constituting a stand, and a limber elongated hose constituting nozzle means and attached to the upper end of said vertical branch, said hose being closed at its outer end and provided inwardly of said outer end with constantly open spray holes, whereby said limber hose, under the action of the pressured water has free whip action and serves to broadcast the issuing water jets over the adjacent surrounding area of the lawn.

CHARLES D. McDONALD.
VERNON M. WILLIAMS.
WILLIAM D. SWILLING.

REFERENCES CITED

The following references are of record in the file of this patent:

UNITED STATES PATENTS

| Number | Name | Date |
|---|---|---|
| 491,443 | Pearson | Feb. 7, 1893 |
| 1,007,657 | Freund | Oct. 31, 1911 |
| 1,939,461 | Phipps | Dec. 12, 1933 |